United States Patent [19]

Wareham

[11] 4,109,302
[45] Aug. 22, 1978

[54] FLIP FLASH HAVING AUTOMATIC INDICATOR CONTROL

[75] Inventor: Richard R. Wareham, Marblehead, Mass.

[73] Assignee: Polaroid Corporation, Cambridge, Mass.

[21] Appl. No.: 746,587

[22] Filed: Dec. 1, 1976

[51] Int. Cl.² ............................................. G03B 15/02
[52] U.S. Cl. .......................................... 362/10; 362/15
[58] Field of Search ................. 240/1.3; 354/126, 127; 362/10, 15

[56] References Cited

U.S. PATENT DOCUMENTS 3,894,226   7/1975   Hanson .................................. 240/1.3

Primary Examiner—Stephen J. Lechert, Jr.
Attorney, Agent, or Firm—David R. Thornton

[57] ABSTRACT

A dual flash array, each alternately connectible to a flashing circuit, having indicators associated with each flash device includes automatic masking devices which mask the indicators associated with the flash array not in the firing circuit.

17 Claims, 7 Drawing Figures

U.S. Patent  Aug. 22, 1978  4,109,302
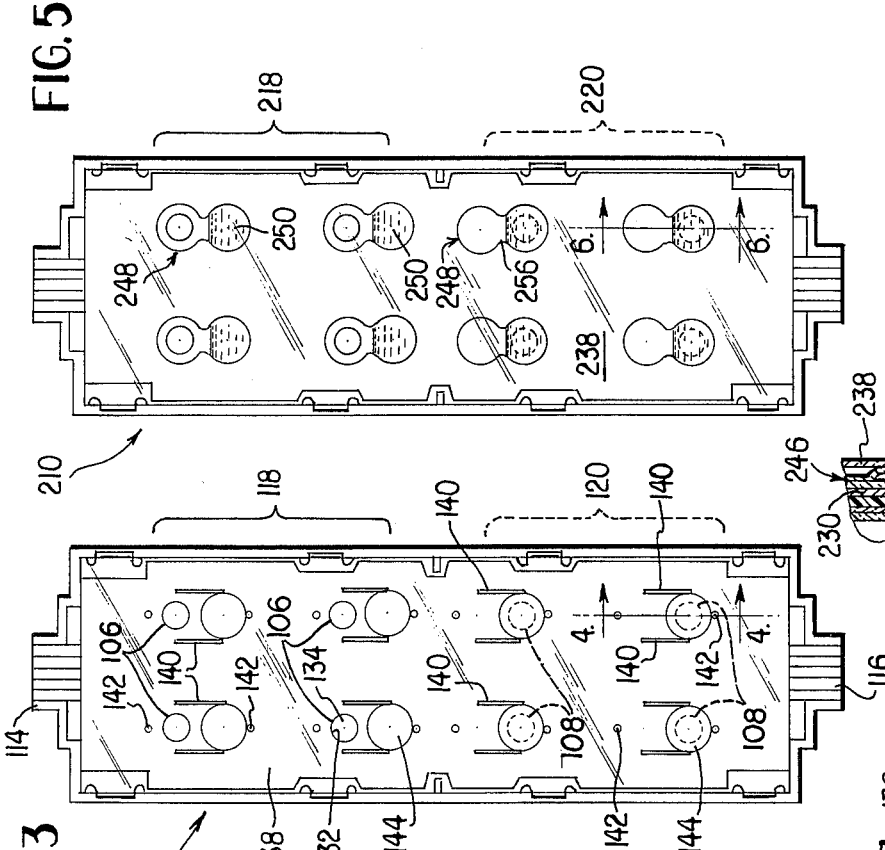
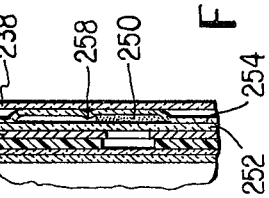
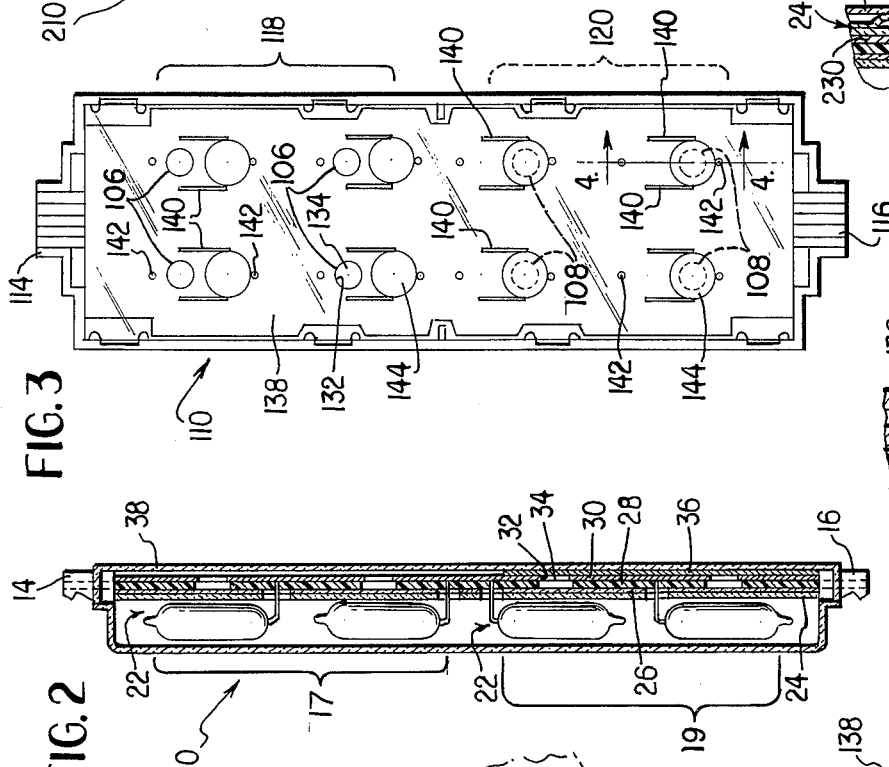
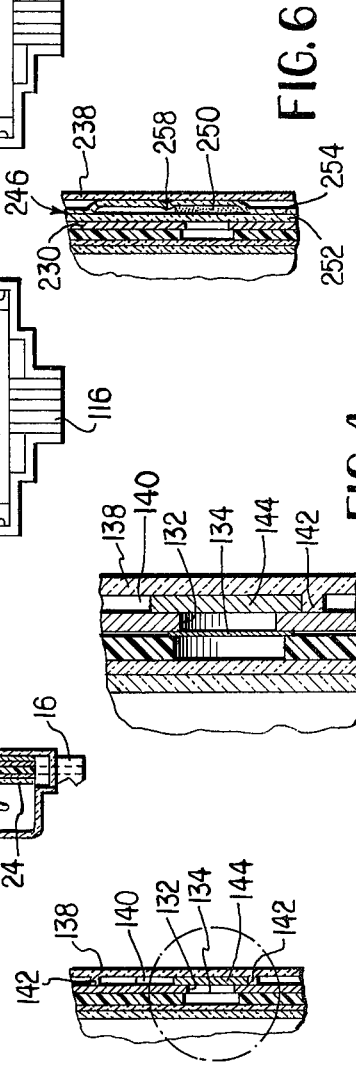
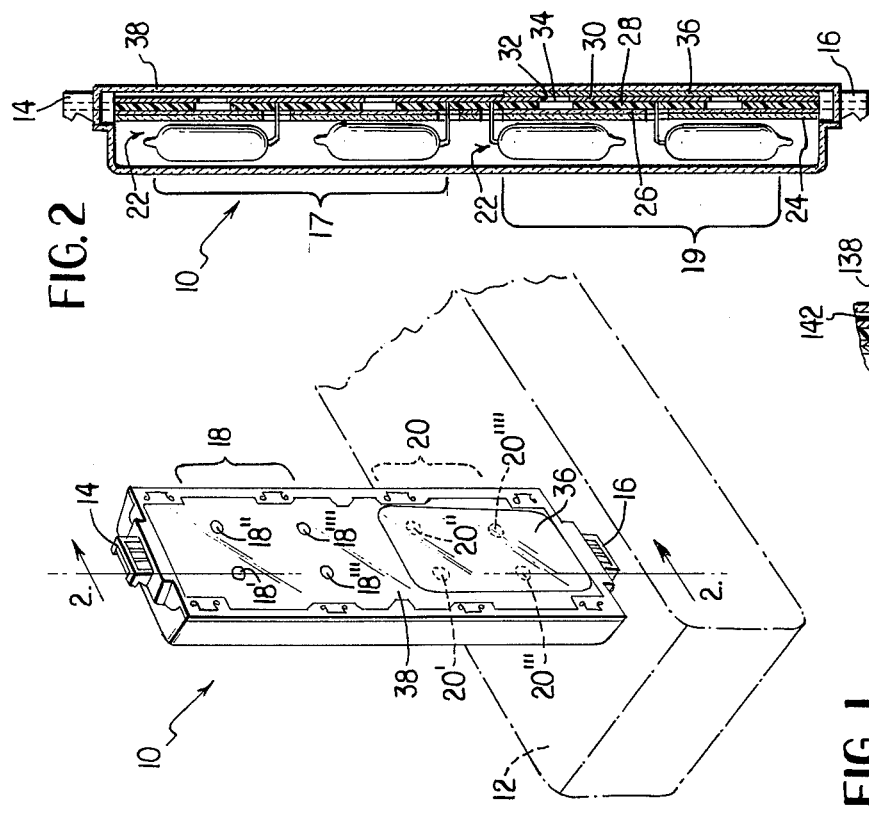

FLIP FLASH HAVING AUTOMATIC INDICATOR CONTROL

BACKGROUND OF THE INVENTION

The invention is concerned with photographic flash units and, more particularly, is directed to multiple flash arrays and flash indicators therefor.

Flash devices having multiple flash units are available in the photographic art. One type of flash arrangement, such as is described in U.S. Pat. No. 3,894,226 employs multiple flash units arranged in arrays at opposite ends of an elongate assembly with all flash units facing in a common direction and with the array at each end of the assembly being energizable via circuitry originating with a connector tab at the other end of the assembly. Similarly arrayed change color indicators, backing each of the individual flash units, exposed to view on the side of the assembly opposite the flash direction, provide a visual indication to the camera operator when the useable flash units of each array are depleted thereby necessitating inversion of the assembly.

In a typical flash assembly of this type, two arrays of four flash units each are backed by corresponding arrays of green color indicators which change to black as each flash is expended. Hence, when mounted on a camera, the upper positioned flash array remains operable so long as the upper indicator array includes a green indicator and conversely, when the upper four indicators are black, the operator is aware that the assembly should be inverted. Since all eight of the indicators are simultaneously exposed, an inattentive user may construe the presence of a green indicator in the lower array as signaling an operable condition for the flash assembly such that, upon subsequent camera operation, the next film exposure is improperly exposed. Consequently, it is an object of this invention to provide a multiple flash unit assembly having a novel arrangement for indicating the operating condition of the assembly.

It is a further object of this invention to provide a multiple flash array having an arrangement for controlling the flash indicators thereof in accordance with selective operation of an individual array.

SUMMARY OF THE INVENTION

Briefly, the invention comprises means for rendering inoperative the operational indicator of one flash of a multiple flash assembly responsive to mounting of the assembly on a camera in an orientation in which that one flash is inoperative.

In the illustrated embodiments, the foregoing is effected with a single masking member movable into and out of overlying relation to the indicators of each array or by multiple masks; one associated with each individual indicator. Exemplary of the former is a thin masking sheet dimensioned to simultaneously overlie all of the indicators in either array, respectively, or the latter may comprise discrete disc-like elements. Alternatively, an opaque liquid is flowable into and out of masking relation to the indicators as a function of the vertical disposition of the assembly.

DESCRIPTION OF THE DRAWINGS

FIG. 1 is a rear perspective view of a flash assembly, incorporating the present invention illustrating one operational orientation of the assembly in position on a camera, shown in phantom lines;

FIG. 2 is a vertical section of the flash assembly of FIG. 1 taken along line 2—2 of that figure;

FIG. 3 is a rear view in elevation of another embodiment of the invention and illustrates a flash assembly employing discrete masking elements;

FIG. 4 is a sectional view of a portion of the assembly shown in FIG. 3 and taken along the line 4—4 thereof;

FIG. 4a is a greatly enlarged detail of the section shown in the encircled area of FIG. 4;

FIG. 5 is a rear view in elevation of still another embodiment of the invention and illustrates a flash assembly having liquid masking of the indicators; and FIG. 6 is a view in section of a portion of the assembly of FIG. 5 and taken along line 6—6 of that figure.

DESCRIPTION OF THE PREFERRED EMBODIMENT

The flash assembly 10 of FIGS. 1 and 2 is adapted for invertible mounting on and connection to a firing circuit (not shown) of a camera 12, or other flash firing apparatus, via opposed male connector tabs 14, 16 and presents, at its transparent rear wall 38, opposed indicator arrays 18, 20 backing similarly configured flash arrays designated 17 and 19. Carried within the flash assembly 10 are a plurality of flash lamp members or units 22, a reflector member 24, an insulating sheet 26, a printed circuit board 28, and an indicator sheet 30, the construction details and circuit connections of which are identical to that disclosed in U.S. Pat. No. 3,894,226, herein incorporated by reference. The individual indicators 18', 18", 18''', 18'''' and 20', 20", 20''', 20'''' of the respective arrays 18 and 20 are defined by orifices 32 in indicator sheet 30, each overlying a heat sensitive plastic material 34 which changes from green to black when the associated flash lamp is flashed as explained in the aforementioned patent.

In a typical flash assembly, eight flash lamps 22 are arranged in a pair of rows with the four lamps at a given end of the assembly 10 forming one array which is energized via the connector tab 14 or 16 at the opposite end of the assembly. Hence, it is necessary to re-orient (i.e., invert) the assembly 10 after the first four flash lamp units have been used. In the position illustrated in FIGS. 1 and 2, as individual flash units of the upper flash array 17 are flashed, the corresponding indicators 18', 18", 18''', 18'''' of the upper indicator array 18 will turn from green to black, thus providing a visual indication to the user when the upper four units, and hence, the array 17 has been expended and signaling the necessity for inverting the assembly 10 to connect the flash units of array 19, energizable via connector 14, to the firing circuit. Thus, the presence of a green indicator in the upper positioned indicator array, 18 or 20 as the case may be, indicates a "go" or "flash ready" condition whereas the absence of green indicators in the upper array indicates that all the flash units connected in the firing circuit have been expended.

To preclude an inattentive operator from construing the presence of a green indicator in the lower positioned or, that is, non-operational array 20 as a "go" condition for the entire flash assembly 10, the lower indicators 20' to 20'''' are rendered inoperative, i.e., disguised or masked, when the array is in its non-operational orientation. In the embodiments shown in FIGS. 1 and 2, the masking of the indicators of the non-operational array is effected by a thin opaque sheet 36 mounted for sliding movement between indicator sheet 30 and rear transparent wall 38. Masking sheet 36 is constructed of sheet material of such dimension and mass as to assure its sliding movement, under the influence of gravity, from the position of FIG. 1 masking the lower array 20 to a corresponding position at the opposite end of the assembly when the latter is inverted.

In operation of the embodiment of FIG. 1, the masking sheet 36 is shown in blocking arrangement to the lower indicator array 20, and hence, so long as a green indicator is visible on the assembly 10, the latter is in a "go" condition. Then, when the upper flash unit array 18 has been depleted as indicated by a darkened or black condition of all four indicators 18' to 18'''' in upper array 18, the assembly is inverted and connector tab 14 inserted in the camera socket whereupon masking sheet 36 will fall to the lower end of the assembly exposing indicator array 20. In the event array 20 had been previously flashed, the absence of a green indicator would signal depletion of the entire assembly.

Turning now to the embodiments shown in FIGS. 3 and 5, it should first be noted that the basic flash assembly components and color change indicators are identical to those of FIGS. 1 and 2 and the assembly differs therefrom in the details of the indicator masking means.

In the embodiment shown in FIGS. 3 and 4, a rear transparent housing 138 is formed with inwardly extending parallel guides 140 and protuberances 142 defining a plurality of caged paths, one respectively for each of a plurality of opaque discs or masking members 144 which slide into and out of overlying relation to indicators 106 and 108 as a function of the vertical disposition of flash assembly 110. With particular reference to FIG. 3, it will be seen that the protuberances 142 and guides 140 for each masking member 144 are arranged so that when the assembly 110 is in position to be energized via connector tab 116, the individual indicators 108 of the lower positioned indicator array 120 are each covered by a member 144 while the indicators 106 of the upper positioned indicator array 118 are exposed to view with the members assuming a reversed position upon inversion of the flash assembly. As in the previously described embodiment, an indicator sheet 130 carries indicator openings 132 which overly heat sensitive material 134 as best seen in the enlarged illustration of FIG. 4a.

It should be understood that the masking discs 144 rather than merely masking the indicator element 134 could, in fact, be made of, or carry, the indicator material itself, and hence, the indicator members 34 and 134 in conjunction with the masking members 36 and 144 provide means responsive to mounting of the flash assembly on the flash firing apparatus in a predetermined orientation for indicating the operative condition of solely that array which is intended to be operable when the assembly is mounted in that predetermined orientation. More specifically, the above-noted masking members 34 and 134 provide means, responsive to mounting of the flash assembly on its flash firing apparatus in a given orientation wherein at least one array is inoperative, for obscuring, disguising or otherwise rendering inactive the indicator condition of that inoperative array.

As shown herein, each flash array includes a plurality of lamps and associated indicators, however, the invention is useful where only one indicator associated with the last flash in the array is employed to, in effect, provide a single indicator of the array condition. The invention is also operable with flash assemblies wherein single bulbs, rather than an array thereof, are operative in accordance with camera mounting orientation. Further, while the obscuring means are illustrated as operable by gravity alone, i.e., responsive solely to flash assembly orientation, they could be responsive to actual insertion of the flash terminal in the camera socket. For example, the camera receiving socket could mechanically displace the masking element or other means for obscuring the indicator or indicators of the then inoperative array.

Liquid masking arrangements may also be employed as in FIGS. 5 and 6 wherein the flash assembly 210 includes a transparent plastic laminate 246 formed to include discrete, elongate blister-type receptacles 248 approximately half filled with an opaque liquid 250. The laminate, consisting of front and rear transparent laminae 252, 254, is sandwiched between an indicator sheet 230 and a transparent rear wall 238 with elongate receptacles 248 occupying the same relative positions to the upper and lower indicator arrays as described in connection with the disc cages of FIG. 3. Each receptacle 248 is centrally necked at 256 and 258 to define a restricted flow passage between opposite ends thereof as will be apparent from a comparative inspection of FIGS. 5 and 6.

With the flash assembly 210 in the position of FIG. 5, the opaque liquid 250 in the lower four receptacles mask lower indicator array 220 while the upper indicator array 218 is visible through the upper half of transparent receptacles 248. Upon inversion of flash assembly 210, indicator array 220 becomes visible through the upper half of the associated receptacles 248.

It is, of course, apparent that the masking means 36, 144 and 250 need not necessarily be opaque so long as the intended function of masking the green indicators of the lower positioned array is achieved. For example, optical filter elements of glass or plastic might be substituted for sliding elements 36 or 144 so long as their light transmission characteristics sufficiently disguise or mask the green color of the underlying indicators. Similarly, a colored liquid could be used with the FIG. 5 embodiment which would mask the green color indicators, such as by making them appear dark.

It is believed that the advantages and improved results furnished by the flash apparatus of the present invention are apparent from the foregoing description of the several embodiments of the invention and that various changes and modifications may be made without departing from the spirit and scope of the invention as sought to be defined in the claims that follow.

What is claimed is:

1. In a flash assembly adapted to be alternately mounted on a camera in first and second orientations and including at least one unfired flash lamp in operative relationship with the camera only when said flash assembly is mounted on said camera in said first orientation and at least one other unfired flash lamp in operative relationship with the camera only when said flash assembly is mounted on the camera in said second orientation, said flash assembly further including one means for indicating that said first flash lamp has not been fired and another means for indicating that said other flash lamp has not been fired, both said one and said other indicating means comprising means actuatable from an initial condition indicating that its said respective lamp has not yet been fired to a subsequent condition indicating that its said respective lamp has been fired, the improvement comprising: means automatically responsive to said flash assembly being mounted on the camera in said first orientation, when the camera is disposed in its normal flash mode operating position, for controlling said other means for indicating so as to at least obscure the indication of its initial condition and responsive to said flash assembly being mounted on the camera in said second orientation, when the camera is disposed in its said normal flash mode operating position, for controlling said one means for indicating so as to at least obscure the indication of its initial condition such that only the indicating means of the operatively mounted lamp is effective for indicating to the operator its said initial condition.

2. The flash assembly of claim 1 wherein said means for controlling said indicators comprises a member mounted for slideable movement into overlying relation to said indicators 3. In a flash assembly of the type having a plurality of flash lamp arrays and at least one indicator operatively associated with each said array for providing an initial condition when at least one of the lamps of its associated array has yet to be flashed and a subsequent condition when none of the lamps of that array remain operable for flashing, the flash assembly being selectively mountable on flash firing apparatus in different, alternate orientations wherein in each orientation at least one of said arrays may be rendered operative such that its lamps may be flashed and at least one other array is inoperative, the improvement comprising means, responsive to mounting of said flash assembly in a give orientation on the flash apparatus, for controlling the lamp indicator of the array which is inoperative in that given orientation so as to at least obscure the indication of the initial condition of that indicator such that only the indicator of the operatively mounted array is effective for indicating to the operator its initial condition.

4. The assembly of claim 3 wherein said controlling means includes means for apparently altering the condition of the indicator associated with the inoperatively mounted array to said subsequent condition.

5. The assembly of claim 3 wherein said initial condition of each of said indicators is a first color and said subsequent condition is a second color, and said controlling means includes means for at least apparently altering the color of the indicator of the inoperatively mounted array to a color at least different from said first color.

6. The assembly of claim 3 wherein said initial condition of each of said indicators is a first color and said subsequent condition is a second color, and said controlling means includes means for at least apparently altering the color of the indicator of the inoperatively mounted array to said second color.

7. The assembly of claim 3 wherein said initial condition of at least a given of said indicators is a first color viewable in a given area of said array and said subsequent condition is a second color viewable in said given area, and said controlling means includes means for providing in said given area a color at least different from said first color when the array operatively associated with said given indicator is inoperatively mounted on the flash firing apparatus.

8. The assembly of claim 3 wherein said controlling means includes at least one masking member mounted for slideable movement between a first position remote from a given indicator to a second position in overlying relation thereto responsive to displacement of said assembly between a first orientation on said apparatus wherein the array respectively associated with said given indicator may be rendered operative and a second orientation wherein said array respectively associated with said given indicator is inoperative and another array may be rendered operative.

9. The assembly of claim 8 wherein said masking member is substantially opaque.

10. The assembly of claim 8 wherein each of said arrays includes a plurality of spaced flash lamps with a lamp indicator operatively associated with each of said lamps thereof, and said masking members is a planar member dimensioned to simultaneously overly all of the indicators of a given array when said member is in its said second position and to uncover all of said indicators of said given array when said member is in its said first position.

11. The assembly of claim 8 wherein each said array includes a plurality of flash lamps and respective individual indicators therefor, with an individual masking member associated with each of said indicators.

12. The assembly of claim 3 wherein said inactive rendering means comprises a liquid contained in said assembly for flowable movement into and out of overlying relation with the indicators of a given array responsive to displacement of said assembly into and out of an orientation in which said given array is rendered inoperative.

13. The assembly of claim 12 wherein said liquid is opaque.

14. The assembly of claim 3 wherein said assembly is invertibly mountable to provide the different, alternate orientations, and said controlling means comprises means mounted in said assembly for displacement responsive to gravity between a first position remote from a given indicator and a second position overlying said indicator.

15. The assembly of claim 3 having an elongated body containing a pair of said flash arrays positioned along the longitudinal axis thereof and facing in a common direction, with each of said flash arrays having at least one oppositely directed indicator, said assembly being configured for invertible mounting on said flash firing apparatus for rendering one of said arrays selectively operative and the other inoperative, and wherein said controlling means comprises at least one masking sheet slideably mounted in said flash assembly for movement from between a first position in covering relation to at least one indicator and a second position in uncovering relation thereto.

16. The assembly of claim 14 wherein said masking sheet is mounted in said assembly for said movement responsive to gravity when said assembly is oriented for mounting on said flash firing apparatus.

17. In a flash assembly of the type having a plurality of flash lamp arrays and at least one indicator operatively associated with each said array for providing an initial condition when any of the lamps of its associated array have yet to be flashed and a subsequent condition when all the lamps of that array have been flashed, the flash assembly being selectively mountable on flash firing apparatus in different, alternate orientations wherein in each orientation at least one of said arrays may be flashed and at least one other array is rendered inoperative, the improvement comprising means, responsive to mounting of said flash assembly in a given orientation on the flash apparatus, for rendering inactive the lamp indicator of the array which is inoperative in that given orientation, said inactive rendering means including means displaceable, responsive to said mounting of said assembly on the apparatus in said given orientation, from a first position wherein the initial condition of the indicator of the inoperative array is viewable to a second position wherein the initial condition of the latter indicator is not viewable.

* * * * *